United States Patent

Zhang et al.

(10) Patent No.: US 9,547,840 B2
(45) Date of Patent: Jan. 17, 2017

(54) METHODS FOR ASSOCIATING OBJECTS ON A TOUCH SCREEN USING INPUT GESTURES

(75) Inventors: Lian-Sheng Zhang, Nanjing (CN); Jun Yang, Nanjing (CN); Xiao-Jeng Zhu, Nanjing (CN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/508,385

(22) PCT Filed: Dec. 28, 2009

(86) PCT No.: PCT/CN2009/001563
§ 371 (c)(1),
(2), (4) Date: May 7, 2012

(87) PCT Pub. No.: WO2011/079408
PCT Pub. Date: Jul. 7, 2011

(65) Prior Publication Data
US 2012/0256863 A1 Oct. 11, 2012

(51) Int. Cl.
*G06F 3/041* (2006.01)
*G06Q 10/10* (2012.01)
*G06F 3/0488* (2013.01)

(52) U.S. Cl.
CPC ........... *G06Q 10/10* (2013.01); *G06F 3/04883* (2013.01)

(58) Field of Classification Search
CPC  G06F 3/04883; G06F 3/0482; G06F 3/04842; G06F 3/0481; G06F 3/0488; G06Q 10/10
See application file for complete search history.

(56) References Cited

U.S. PATENT DOCUMENTS

| | | | |
|---|---|---|---|
| 2005/0015444 A1* | 1/2005 | Rambo | 709/204 |
| 2005/0160372 A1 | 7/2005 | Gruen et al. | |
| 2005/0237308 A1 | 10/2005 | Autio et al. | |
| 2006/0067577 A1* | 3/2006 | Marggraff et al. | 382/187 |

(Continued)

FOREIGN PATENT DOCUMENTS

| | | |
|---|---|---|
| CN | 1437098 A | 8/2003 |
| CN | 1804860 A | 7/2006 |

(Continued)

OTHER PUBLICATIONS

International Search Report and Written Opinion from International Application No. PCT/CN2009/001563, dated Oct. 8, 2010, 9 pp.
Notice of Preliminary Rejection from counterpart Korean Patent Application No. 10-2012-7016758, dated Oct. 1, 2013, 1 pp.
Extended European Search Report from counterpart European Application No. 09852693.2, dated Mar. 3, 2014, 6 pp.

(Continued)

*Primary Examiner* — Alexander Eisen
*Assistant Examiner* — Abhishek Sarma
(74) *Attorney, Agent, or Firm* — Shumaker & Sieffert, P.A.

(57) ABSTRACT

Methods are provided for managing a multitude of objects displayed on a touch screen by selectively associating objects using free-form input gestures. A method comprises displaying a plurality of objects on the touch screen, identifying a first free-form input on the touch screen overlying a first object of the plurality of objects, and identifying a second free-form input gesture on the touch screen overlying a second object of the plurality of objects. The first object and the second object are associated when the first free-form input and the second free-form input each substantially correspond to the same input gesture.

12 Claims, 6 Drawing Sheets

(56) References Cited

U.S. PATENT DOCUMENTS

| | | |
|---|---|---|
| 2007/0229471 A1 | 10/2007 | Kim et al. |
| 2008/0259042 A1 | 10/2008 | Thorn |
| 2009/0128505 A1 | 5/2009 | Partridge et al. |
| 2009/0164889 A1* | 6/2009 | Piersol et al. ............... 715/255 |
| 2009/0303231 A1 | 12/2009 | Robinet et al. |
| 2010/0125787 A1* | 5/2010 | Chihara et al. ............... 715/702 |

FOREIGN PATENT DOCUMENTS

| | | |
|---|---|---|
| CN | 1855012 A | 11/2006 |
| CN | 101546233 A | 9/2009 |
| EP | 2 017 708 A1 | 1/2009 |
| WO | 2006076411 A2 | 7/2006 |

OTHER PUBLICATIONS

Notification of the Second Office Action from Chinese Patent Application No. 200980163209.7, dated Jul. 22, 2014, 13 pp.
Response to European Office Action dated Mar. 3, 2014, from counterpart European Application No. 09852693.2, filed on Sep. 30, 2014, 10 pp.
Notification of the Third Office Action from Chinese Application No. 200980163209.7, issued Feb. 5, 2015 11 pp.
Fourth Office Action from counterpart Chinese Application No. 200980163209.7, dated Aug. 18, 2015, 7 pp.
Response to Examination Report from European Patent Application No. 09852693.2, filed May 24, 2016 17 pgs.
Examination Report from counterpart European Application No. 09852693.2, dated Nov. 25, 2015, 6 pp.

* cited by examiner

METHODS FOR ASSOCIATING OBJECTS ON A TOUCH SCREEN USING INPUT GESTURES

TECHNICAL FIELD

Embodiments of the subject matter described herein relate generally to touch sensing applications, and more particularly, embodiments of the subject matter relate to associating objects displayed on the touch screen using free-form input gestures.

BACKGROUND

Many electronic devices use touch screens to present information to a user and also receive input from the user. Some applications involve numerous objects or items being displayed on the touch screens. For example, file folders, photo albums, contact lists or music playlists often include numerous entries. Using the touch screen to organize, categorize, or otherwise manage each object individually becomes tedious and time-consuming, particularly as the number of items increases. Accordingly, it is desirable to reduce the workload on a user when managing objects displayed on the touch screen.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to touch sensing, touch screen calibration and/or configuration, touch screens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Technologies and concepts discussed herein relate to systems utilizing a touch screen as a user interface device. Objects displayed on the touch screen are associated or otherwise correlated based on free-form input gestures overlying the respective objects. Various criteria are assigned to the free-form input gestures, and these criteria, in turn, are assigned to the associated objects corresponding to a respective input gesture, thereby minimizing the number of operations performed by a user that would otherwise be required to assign criteria to objects individually. Actions or operations may be performed on associated objects based on the assigned criteria. Thus, free-form input gestures may be utilized to quickly and intuitively select and group objects and assign criteria and/or perform actions on the groups of objects collectively, thereby minimizing the number of operations performed by a user to manage the displayed objects.

Figure 1:
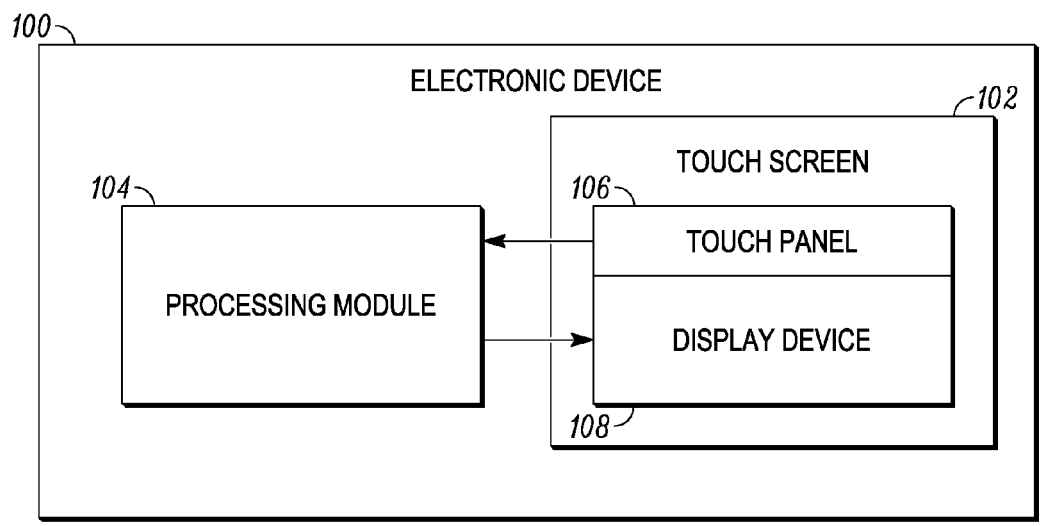
FIG. 1 is a block diagram of an electronic device in accordance with one embodiment.

FIG. 1 depicts an exemplary embodiment of electronic device 100. In an exemplary embodiment, the electronic device 100 includes, without limitation, a touch screen 102 and a processing module 104. It should be understood that FIG. 1 is a simplified representation of an electronic device 100 for purposes of explanation and is not intended to limit the scope of the subject matter in any way. Depending on the embodiment, the electronic device 100 may be realized as a mobile communications device (e.g., cellular phone, personal digital assistant, and the like), a computer, a portable media player (e.g., a digital audio player, a digital video player, or the like), or another suitable electronic device having a touch screen interface.

In an exemplary embodiment, the touch screen 102 provides a user interface with the electronic device 100 and comprises a touch panel 106 and a display device 108. The touch panel 106 is coupled to the processing module 104, wherein the processing module 104 is configured to recognize, identify, or otherwise resolve input received from the touch panel 106, as described in greater detail below. The processing module 104 is coupled to the display device 108, and the processing module 104 is configured to control the display and/or rendering of content on the display device 108 and correlates the location of input received from the touch panel 106 with the location of content displayed on the display device 108, as described in greater detail below.

In an exemplary embodiment, the touch panel 106 is realized as a transparent touch panel that is responsive to user input on the surface of touch panel 106. In this regard, in an exemplary embodiment, the user input comprises a pressure (or force) applied to the surface of the touch panel 106 by a user of the electronic device 100 using an input object (e.g., a finger, stylus, digital pen, or the like). In some embodiments, the touch panel 106 may also be responsive to an input object (e.g., a finger) in sufficient proximity to the surface of the touch panel 106, wherein the user input may comprise a user manipulating an input object in sufficient proximity to the surface of the touch panel 106. The touch panel 106 may be realized as a resistive touch panel, a capacitive touch panel, or the touch panel 106 may be realized using another suitable technology (e.g., surface acoustic waves, or other sonic technologies). In this regard, the touch panel 106 is utilized to resolve user input at various locations on the touch panel 106 to one or more input gestures corresponding to objects displayed on the touch screen 102, as described in greater detail below. The touch panel 106 is preferably disposed proximate the display device 108 and aligned with respect to the display device 108 such that the touch panel 106 is interposed in the line-of-sight between a user and the display device 108 when the user views content displayed on the display device 108. In this regard, from the perspective of a user and/or viewer of the touch screen 102 and/or display device 108, at least a portion of the touch panel 106 overlaps and/or overlies content displayed on the display device 108. In accordance with one embodiment, the touch panel 106 is substantially planar in shape and disposed adjacent to a substantially planar surface of the display device 108.

In an exemplary embodiment, the display device 108 is realized as an electronic display configured to graphically display information and/or content under control of the processing module 104. Depending on the embodiment, the display device 108 may be realized as a liquid crystal display (LCD), a cathode ray tube display (CRT), a light emitting diode (LED) display, an organic light emitting diode (OLED) display, a plasma display, or a projection display, or another suitable electronic display. In accordance with one or more embodiments, the touch panel 106 is integral with the display device 108. For example, if the display device 108 has a substantially planar viewing area, the touch panel 106 may be aligned parallel to the planar viewing area of the display device 108.

The processing module 104 generally represents the hardware, software, and/or firmware components configured to resolve user input on the touch screen 102 and/or touch panel 106 to one or more input gestures, correlate the location(s) of the input gesture(s) with location(s) of content displayed on the display device 108 and perform additional tasks and/or functions described in greater detail below. Depending on the embodiment, the processing module 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing module 104 may also be implemented as a combination of computing devices, e.g., a combination of a digital signal processor and a microprocessor, a plurality of microprocessors, one or more microprocessors in conjunction with a digital signal processor core, or any other such configuration. In practice, the processing module 104 includes processing logic that may be configured to carry out the functions, techniques, and processing tasks associated with the operation of the electronic device 100, as described in greater detail below. Furthermore, the steps of a method or algorithm described in connection with the embodiments disclosed herein may be embodied directly in hardware, in firmware, in a software module executed by the processing module 104, or in any practical combination thereof.

Figure 2:
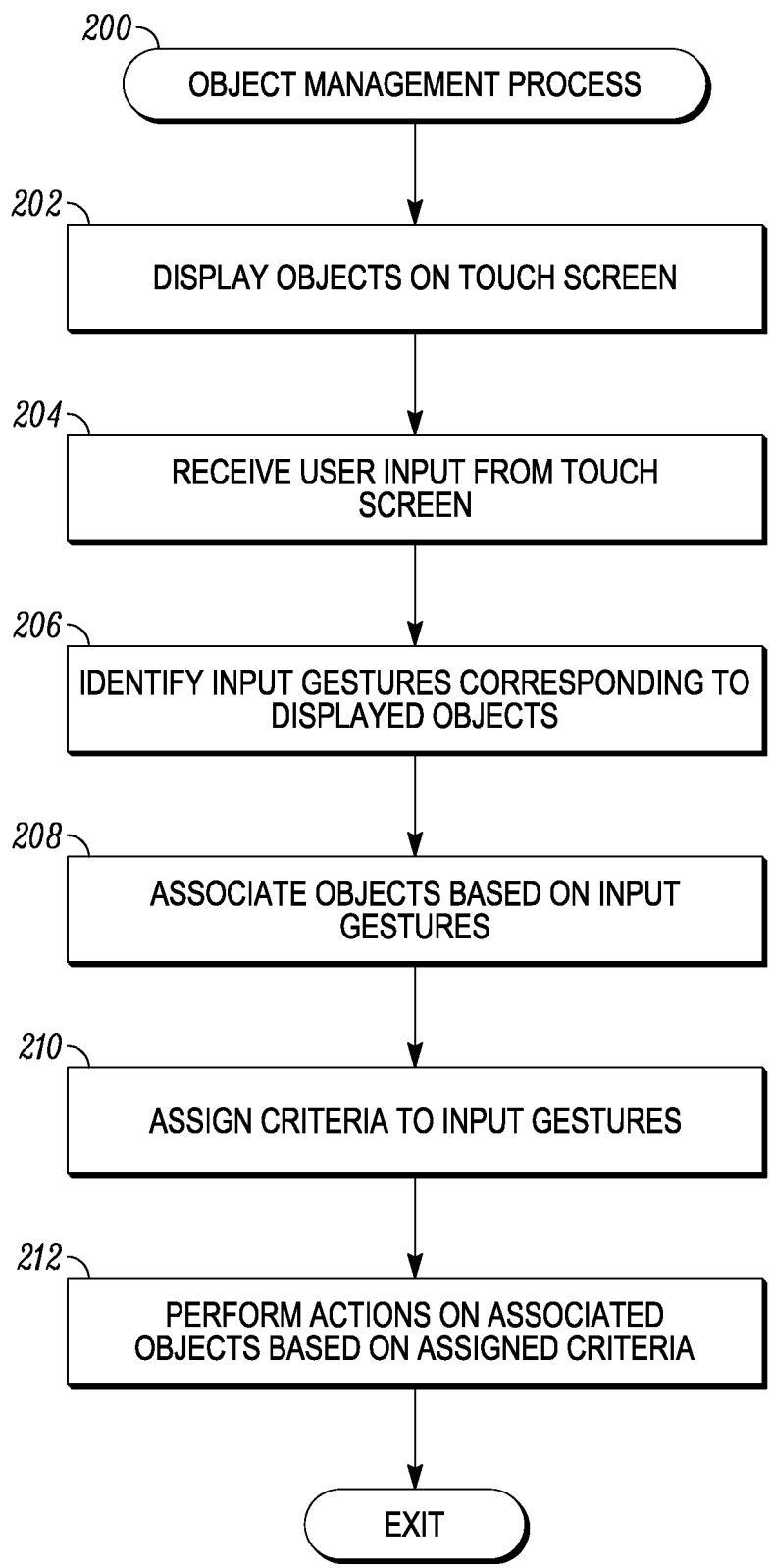
FIG. 2 is a flow diagram of an object management process suitable for use with the electronic device of FIG. 1 in accordance with one embodiment.

Referring now to FIG. 2, in an exemplary embodiment, a display system may be configured to perform an object management process 200 and additional tasks, functions, and/or operations as described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the touch screen 102, the processing module 104, the touch panel 106 and/or display device 108. It should be appreciated any number of additional or alternative tasks may be included, and may be incorporated into a more comprehensive procedure or process having additional functionality not described in detail herein.

Figure 3:
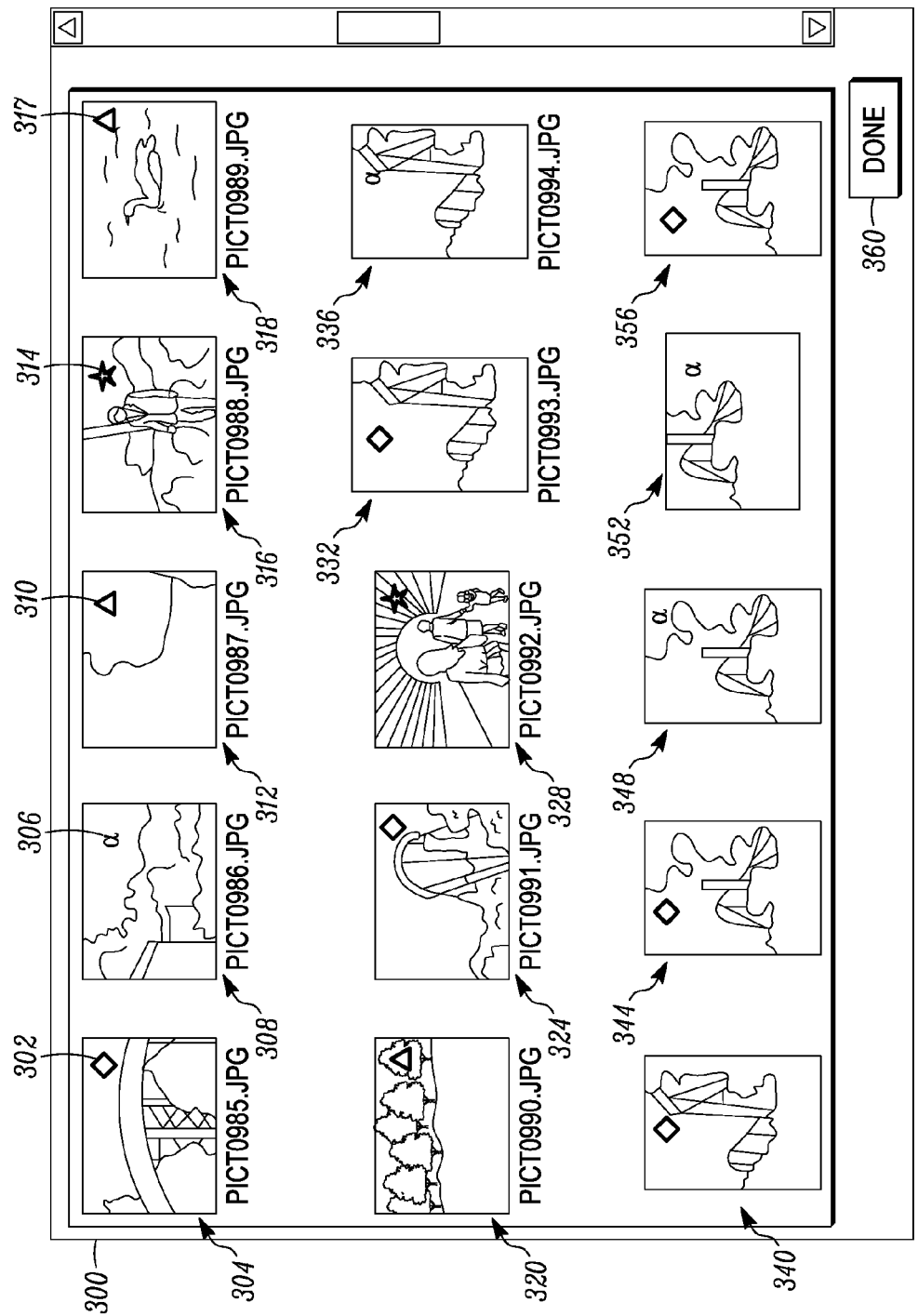
FIG. 3 depicts touch screen suitable for use with the object management process of FIG. 2 in accordance with one embodiment.

Referring to FIG. 2, and with continued reference to FIG. 1, an object management process 200 may be performed to enable a user to manage objects (or items) displayed on a touch screen in an efficient and intuitive manner. The object management process 200 begins by displaying and/or rendering graphical content comprising a plurality of objects (or items) on the touch screen (task 202). In an exemplary embodiment, an object displayed on the touch screen (or alternatively, a displayed object) comprises a graphical representation of a file (e.g., an audio file, a video file, a word processor file, or another suitable type of file), an image, a contact, or another piece of information or object maintained by and/or otherwise associated with an application, program, or other software being executed by the processing module 104, as will be appreciated in the art. For example, as shown in FIG. 3, the processing module 104 may display a plurality of thumbnail images on a touch screen 300 (e.g., touch screen 102 and/or display device 110), wherein each thumbnail corresponds to a file, image, contact, or another piece of information maintained by and/or otherwise associated with the processing module 104. In an exemplary embodiment, the plurality of objects are displayed on the touch screen 300 concurrently, such that a user may review and select objects from among the plurality of objects, as described in greater detail below.

Referring again to FIG. 2, in an exemplary embodiment, the object management process 200 continues by receiving or otherwise obtaining user input from the touch screen (task 204). In this regard, in an exemplary embodiment, the user input comprises one or more strokes, movements, markings, or the like, that are imparted by a user of the electronic device 100 to the touch screen 102 and/or touch panel 106, for example, by applying and/or pressing an input object (e.g., a finger, stylus, digital pen, or the like) to the surface of the touch screen 102 and/or touch panel 106 or placing the input object in sufficient proximity to the touch screen 102 and/or touch panel 106. In an exemplary embodiment, the object management process 200 continues by recognizing or otherwise identifying, based on the user input, free-form input gestures corresponding to one or more objects of the objects displayed on the touch screen (task 206). As used herein, a free-form input gesture should be understood as a discrete free-form symbol or mark imparted by a user on the surface of the touch screen (or touch panel) overlying the respective displayed object. It should be understood that a free-form input gesture may comprise or otherwise be created by one or more strokes, movements, markings, or other manipulations of the input object made by the user of the electronic device 100. In this manner, the free-form input gestures may have user-defined shapes, sizes, orientation, and the like. As used herein, a free-form input gesture corresponds to a respective displayed object when the location of at least a portion of the free-form input gesture on the touch panel 106 overlies the location of at least a portion of the object displayed on the display device 108.

In an exemplary embodiment, the processing module 104 correlates the location of the user input on the touch panel 106 with the location of objects displayed on the display device 108 in order to recognize or otherwise identify a free-form input gesture overlying an object displayed on the display device. It should be appreciated that the subject matter described herein is not limited to any particular geometric arrangement for the free-form input gestures, and in practice, any distinguishable input on the touch screen may comprise a free-form input gesture. For example, in practice, a free-form input gesture may be realized as using any suitable shape or symbol, such as, for example, a checkmark, a letter, a number, or another alphanumeric symbol, or any other shape or symbol desired by a user that is applied to the touch screen. In an exemplary embodiment, the free-form input gestures are created and/or defined dynamically by the user input, that is, the user may create a free-form input gesture by imparting a distinguishable input on the touch screen overlying a displayed object. In this manner, the free-form input gestures may be user-defined and created on-the-fly during operation of the electronic device 100. However, in alternative embodiments, the free-form input gestures may correspond to predefined shapes, symbols, patterns, markings, and the like.

In an exemplary embodiment, in response to identifying a free-form input gesture overlying a displayed object, the processing module 104 maintains an association between the respective object and its corresponding free-form input gesture. Accordingly, for convenience, but without limitation, an free-form input gesture corresponding to or otherwise overlying a portion of a displayed object may alternatively be referred to herein as the associated input gesture for the displayed object. For example, referring again to FIG. 3, the processing module 104 recognizes or otherwise identifies a first free-form user input 302 on the touch screen 300 (e.g., touch panel 106) overlying a first object 304 as a free-form input gesture corresponding to the first object 304, and in response, associates the free-form input gesture 302 and the first object 304. As shown in FIG. 3, in response to receiving user input from the touch screen 300, the processing module 104 may also display or otherwise render a graphical representation of the user input 302 at its corresponding location on the touch screen 300 (e.g., on display device 108), as will be appreciated in the art. In a similar manner, the processing module 104 recognizes or otherwise identifies a second free-form user input 306 overlying a second object 308 as a second free-form input gesture that corresponds to the second object 308, a third free-form user input 310 overlying a third object 312 as a third free-form input gesture that corresponds to the third object 312, a fourth free-form user input 314 overlying a fourth object 316 as a fourth free-form input gesture that corresponds to the fourth object 316, and so on. In accordance with one or more embodiments, the object management process 200 maintains the objects and the graphical representations of their associated input gestures displayed on the touch screen until receiving indication that a user is done providing input (for example, by a user selecting a corresponding button 360), such that the graphical representations of the free-form input gestures persist on the touch screen and remain displayed on the touch screen overlying their associated displayed objects. In addition to and/or in lieu of button 360, in other embodiments, a user may indicate he or she is done providing input by selecting or otherwise pressing a hardware key or button on the electronic device 100, inputting a predefined gesture on the touch screen 300, providing an appropriate voice command, or using another suitable means for indicating he or she is done providing input.

As described in greater detail below, in an exemplary embodiment, the free-form input gestures function as tags assigned to or otherwise associated with the displayed objects, allowing the displayed objects to be grouped, associated, correlated, or otherwise aggregated based on their corresponding free-form input gestures to create subsets of the displayed objects. Each free-form input gesture is assigned one or more criteria, which in turn, are assigned to or otherwise associated with each of the displayed objects of the subset of displayed objects associated with the respective input gesture. Different operations, actions or commands may then be performed on the different groups of displayed objects in a manner that is influenced by the assigned criteria. Thus, the input gestures are utilized by the user to select objects from among the displayed objects, group the selected objects in a desired manner, and then assign different criteria to and/or perform different operations on the objects of the groups, thereby allowing the user to manage the displayed objects in an efficient manner. For example, as described in greater detail below, the user utilizes an alpha-shaped input gesture to delete objects (e.g., files) corresponding to thumbnails 308, 348, a star-shaped input gesture to classify objects corresponding to thumbnails 316, 328 in a first category (e.g., a photo album, a music playlist, a file folder, or the like), a triangular-shaped gesture to classify objects corresponding to thumbnails 312, 318, 320 in a second category, and a diamond-shaped input gesture to classify objects corresponding to thumbnails 304, 324, 332, 340, 344, 356 in a third category.

In an exemplary embodiment, the object management process 200 continues by associating or otherwise correlating displayed objects based on their associated input gestures (task 208). In this regard, displayed objects are associated when their associated input gestures are sufficiently similar. In an exemplary embodiment, displayed objects are associated in response to determining their corresponding input gestures are substantially similar (e.g., neglecting insignificant variations) based on geometric characteristics (e.g., shape, size, orientation, and the like) of the input gestures. For example, a first object and a second object may be associated in response to determining a first free-form input gesture associated with the first object and a second free-form input gesture associated with the second object substantially match or are otherwise equivalent based on geometric similarities between the first free-form input gesture and the second free-form input gesture. In some embodiments, the object management process 200 may also compare input gestures based on the manner in which they were created, for example, by taking into account directional information for the strokes, movements, markings, or gestures made by the user of the electronic device 100 that comprise the input gestures. For example, the object management process 200 may associate displayed objects when their associated input gestures each correspond to a clockwise circle, but the object management process 200 may fail to associate a first object and a second object when the input gesture overlying the first object comprises a clockwise circle and the input gesture overlying the second object comprises a counterclockwise circle.

In an exemplary embodiment, the object management process 200 associates a first object and a second object in response to determining the user input overlying or otherwise corresponding to the first object and the user input overlying or otherwise corresponding to the second object each substantially correspond to the same input gesture. In other words, the object management process 200 compares the free-form input gesture overlying the first object to the free-form input gesture overlying the second object and associates the first object and the second object in response to determining that the input gesture overlying the first object substantially matches the input gesture overlying the second object, for example, when the shape and/or size of the input gesture overlying the first object substantially matches the shape and/or size of the input gesture overlying the second object.

For example, referring again to FIG. 3, in the illustrated embodiment, the processing module 104 associates the third object 312 and a fifth object 318 in response to determining the user input 310 overlying the third object 312 substantially matches the user input 317 overlying the fifth object 318. In this regard, the processing module 104 associates the objects 312, 318 in response to determining the input gestures 310, 317 each substantially correspond to a triangular-shaped input gesture based on the geometric similarities between the user input 310 overlying the third object 312 and the user input 317 overlying the fifth object 318. In a similar manner, in the illustrated embodiment, a sixth object 320 is associated with the third and fifth objects 312, 318 because the input gesture associated with the sixth object 320 substantially matches or otherwise corresponds to the input gesture for the third and fifth objects 312, 318. Thus, for the illustrated embodiment, the first object 304, a seventh object 324, a ninth object 332, an eleventh object 340, a twelfth object 344 and a fifteenth object 356 are associated because their associated input gestures each substantially correspond to a diamond-shaped input gesture, the second object 308, a tenth object 336, a thirteenth object 348, and a fourteenth object 352 are associated because their associated input gestures each substantially correspond to an alpha-shaped input gesture, and the fourth object 316 and a ninth object 328 are associated because their associated input gestures each substantially correspond to a star-shaped input gesture. In this manner, objects 304, 324, 332, 340, 344, 356 associated with a diamond-shaped input gesture comprise a first subset of the displayed objects, objects 308, 336, 348, 352 associated with an alpha-shaped input gesture comprise a second subset of the displayed objects, objects 312, 318, 320 associated with a triangular-shaped input gesture comprise a third subset of the displayed objects, and objects 316, 328 associated with a star-shaped input gesture comprise a fourth subset of the displayed objects.

Referring again to FIG. 2, in an exemplary embodiment, the object management process 200 continues by assigning one or more criteria to each input gesture (task 210). Depending on the embodiment, the criteria assigned to an input gesture may comprise an action, operation, or command, a category, class or another grouping, a priority, or another suitable characteristic, attribute, or property for a particular application. Each input gesture may be pre-assigned with and/or preconfigured for default criteria, such as, for example, a default action or category, or each input gesture may be dynamically assigned criteria by a user. In this regard, in embodiments where the criteria is assigned by the user, the object management process 200 may predict the criteria to be assigned to an input gesture by maintaining an association between an input gesture and its previously assigned criteria, thus obviating the need for a user to subsequently assign the same criteria to a particular input gesture.

Figure 4:
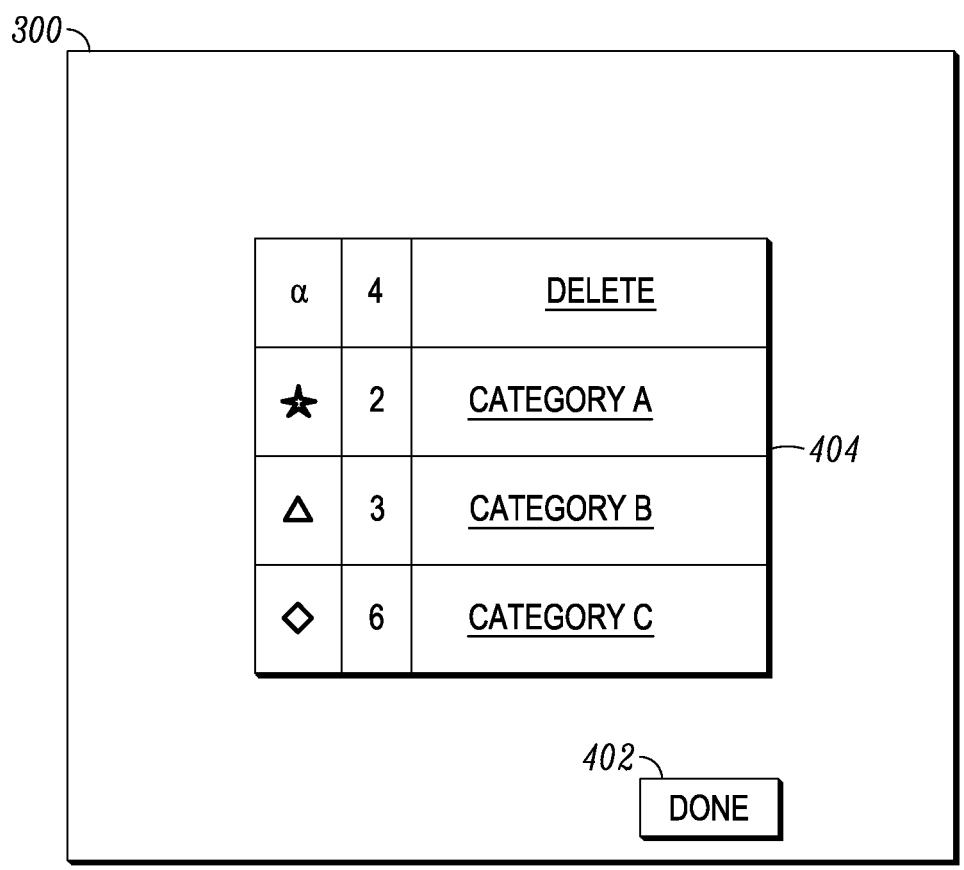
FIG. 4 depicts an association between input gestures and assigned criteria suitable for use with the touch screen of FIG. 3 in accordance with one embodiment.

Referring to FIG. 3 and FIG. 4, in accordance with one or more embodiments, the object management process 200 may prompt a user to assign criteria to the identified input gestures in response receiving indication from a user that he or she is finished providing user input. For example, in response to a user selecting a button 360 (e.g., by touching the touch panel 106 overlying the button 360) that indicates the user is finished providing input, the object management process 200 may display a graphical user interface element 404, such as a menu, that is configured to allow a user to assign criteria to the identified input gestures. For each identified input gesture, the user provides one or more desired criteria to be associated with and/or assigned to the respective input gesture, for example, by selecting a desired action and/or category from a list of possible options or manually entering the desired action and/or category for each identified input gesture. For example, as shown in FIG. 4, a user may assign a delete operation to the alpha-shaped input gesture (e.g., second input 306), a first category (e.g., 'CATEGORY A') to the star-shaped input gesture (e.g., fourth input 314), a second category (e.g., 'CATEGORY B') to the triangular-shaped input gesture (e.g., inputs 310, 317), and a third category (e.g., 'CATEGORY C') to the diamond-shaped input gesture (e.g., first input 302). As described above, in alternative embodiments, the object management process 200 may predict and/or pre-assign the criteria to the input gestures, thereby reducing the workload on a user to manually assign or otherwise designate criteria for the input gestures.

In an exemplary embodiment, any criteria assigned to or otherwise associated with a respective input gesture is also assigned to or otherwise associated with each object associated with the respective input gesture. Thus, each object of the first subset of displayed objects 304, 324, 332, 340, 344, 356 is associated with the third category, each object of the second subset of displayed objects 308, 336, 348, 352 is associated with the delete operation, each object of the third subset of displayed objects 312, 318, 320 is associated with the second category, and each object of the fourth subset of displayed objects 316, 328 is associated with the first category. As shown in FIG. 4, the object management process 200 may display the number of objects associated with each input gesture, that is, the number of objects in each subset of displayed objects, thereby providing indication to the user regarding the number of objects to be associated with the various criteria for the input gestures.

Referring again to FIG. 2, in an exemplary embodiment, the object management process 200 continues by performing the action(s) on the associated objects based on the criteria assigned to the input gestures for the associated objects (task 212). In this regard, each object of a subset of the displayed objects is managed in a manner that is influenced by the one or more criteria assigned to the input gesture associated with the subset. Referring again to FIG. 3 and FIG. 4, in the illustrated embodiment, the object management process 200 performs the delete operation on the subset of displayed objects 308, 348 associated with the alpha-shaped input gesture, for example, by the processing module 104 deleting the files and/or information corresponding to each object 308, 348. The object management process 200 may categorize or otherwise classify the subset of objects 316, 328 associated with the star-shaped input gesture 314 in the first category, the subset of objects 312, 318, 320 associated with the triangular-shaped input gesture 310, 317 in the second category, and the subset of objects 304, 324, 332, 340, 344, 356 associated with the diamond-shaped input gesture 302 in the third category. For example, when the objects displayed on the touch screen 300 correspond to image files, the categories assigned the input gestures may correspond to photo albums, wherein the images corresponding to objects 316, 328 are placed into a first photo album, the images corresponding to objects 312, 318, 320 are placed into a second photo album, and the images corresponding to objects 304, 324, 332, 340, 344, 356 are placed into a third photo album. In an alternative embodiment, the objects displayed on the touch screen 300 may correspond to audio files and the categories assigned the input gestures may correspond to playlists, wherein the audio files corresponding to objects 316, 328 are placed into a first playlist, the audio files corresponding to objects 312, 318, 320 are placed into a second playlist, and the audio files corresponding to objects 304, 324, 332, 340, 344, 356 are placed into a third playlist. It should be appreciated that the subject matter is not intended to be limited to any particular type of content, and other types of content may be suitably categorized or classified in similar manner.

In accordance with another embodiment, the input gestures may be assigned different priorities, wherein the objects are sorted based on the priorities assigned to the input gestures. For example, referring again to FIG. 3, a first priority may be assigned to the alpha-shaped input gesture 306, a second priority may be assigned to the star-shaped input gesture 314, a third priority may be assigned to the triangular-shaped input gesture 310, 317, and a fourth priority may be assigned to the diamond-shaped input gesture 302. The object management process 200 sorts the objects based on the assigned priorities, such that objects 308, 348 associated with the alpha-shaped input gesture 306 are ordered first, followed by objects 316, 328 associated with the star-shaped input gesture 314, objects 312, 318, 320 associated with the triangular-shaped input gesture 310, 317, and objects 304, 324, 332, 340, 344, 356 associated with the diamond-shaped input gesture 302.

Referring again to FIG. 2, in accordance with one or more embodiments, when the object management process 200 predicts and/or pre-assigns criteria to the input gestures, the object management process 200 may automatically perform action(s) on the associated objects based on the criteria assigned to the input gestures (e.g., task 212), that is, the object management process 200 performs action(s) on the associated objects without prompting the user to assign criteria or otherwise confirm the action(s) to be performed. For example, referring again to FIG. 3, the alpha-shaped input gesture may be pre-assigned the delete operation, the star-shaped input gesture may be pre-assigned the first category, the triangular-shaped input gesture may be pre-assigned the second category, and the diamond-shaped input gesture may be pre-assigned the third category, wherein in response to the receiving indication that the user is done providing input (e.g., by the user selecting button 360), the processing module 104 automatically delete the files and/or information corresponding to objects 308, 348, classify objects 316, 328 in the first category, classify objects 312, 318, 320 in the second category, and classify objects 304, 324, 332, 340, 344, 356 in the third category without any other intervention or action by the user after selecting button 360. In alternative embodiments, the object management process 200 may perform action(s) on the associated objects based on the criteria assigned to the input gestures in response to the user confirming the criteria assigned to the input gestures or otherwise receiving indication that the user is done providing criteria to be assigned to the input gestures. For example, the object management process 200 may perform action(s) on the associated objects based on the criteria assigned to the input gestures in response to the user selecting a button 402 on the touch screen 300 that indicates the user is finished modifying the criteria assigned to the input gestures or otherwise accepts the predicted and/or pre-assigned criteria.

Figure 5:
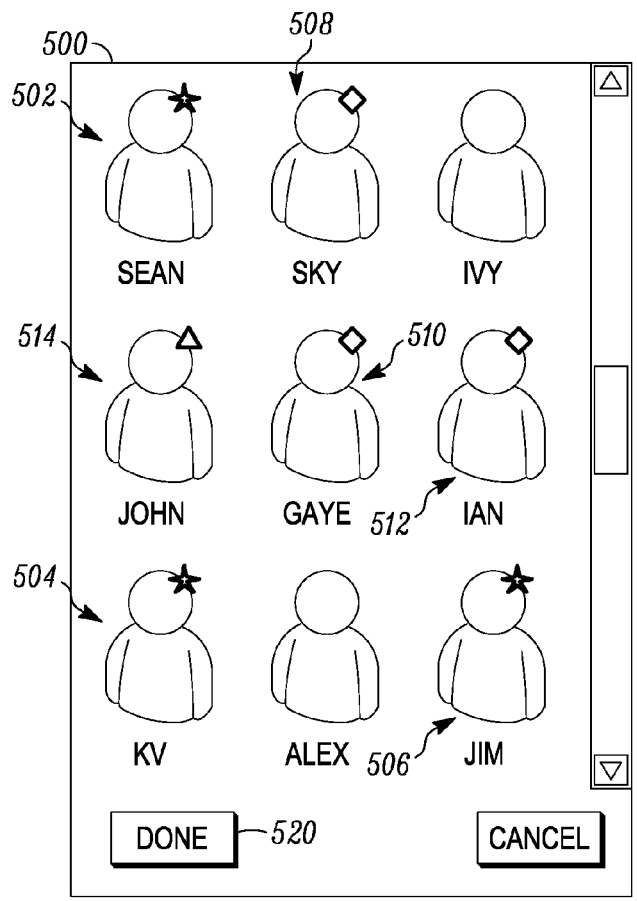
FIG. 5 depicts touch screen suitable for use with the object management process of FIG. 2 in accordance with another embodiment.
Figure 6:
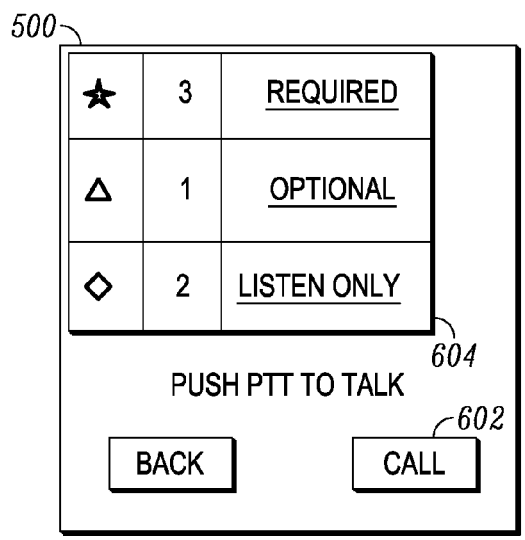
FIG. 6 depicts an association between input gestures and desired participation statuses suitable for use with the touch screen of FIG. 5 in accordance with one embodiment.

Referring now to FIG. 5 and FIG. 6, and with continued reference to FIG. 1 and FIG. 2, the object management process 200 may be utilized when initiating a group call. In the illustrated embodiment, the processing module 104 displays a contact list comprising plurality of objects on a touch screen 500 (e.g., task 202), wherein each object corresponds to a contact in a contact list stored or otherwise maintained by the processing module 104. As shown in FIG. 5, the user may provide user input on the touch screen 500 to select participants for the group call from the user's contact list by imparting input gestures overlying the desired participants (e.g., tasks 204, 206). As described in greater detail below, in accordance with one embodiment, the input gestures are utilized to designate or otherwise assign a participation status to each selected participant. The object management process 200 associates selected contacts based on their corresponding input gestures (e.g., task 208), such that an association is created among contacts 502, 504, 506 associated with a first input gesture (e.g., a star-shaped input gesture) and an association is created among contacts 508, 510, 512 associated with a second input gesture (e.g., a diamond-shaped input gesture). Each input gesture may be assigned a category corresponding to a desired participation status, such that each selected contact 502, 504, 506, 508, 510, 512, 514 is assigned a desired participation status. For example, as shown in FIG. 6, after a user finishes selecting the desired contacts (e.g., by selecting button 520), the object management process 200 may prompt the user to assign a participation status to each received input gestures (or alternatively, the participation statuses may be pre-assigned and/or predicted as described above) by presenting a graphical user interface element 604 on the touch screen 500. As shown in FIG. 5, by virtue of the association between contacts and input gestures, contacts 502, 504, 506 are designated a first participation status (e.g., required), contact 514 is designated a second participation status (e.g., optional), and contacts 508, 510, 512 are designated a third participation status (e.g., listen only). A user may then initiate the group call, for example, by pressing a push-to-talk button, or alternatively, by selecting a button 602 on the touch screen 500. In response to the user initiating or otherwise executing the group call, the object management process 200 continues by initiating or otherwise executing the group call. In this regard, a desired message may be sent to each selected contact 502, 504, 506, 508, 510, 512, 514 and the selected contacts 502, 504, 506, 508, 510, 512, 514 may be allowed to subsequently participate the group call in a manner that is influenced by the designated participation status. It should be appreciated that the subject matter is not limited to group calls, and may be utilized in a similar manner for other communications tasks, such as, for example, designating email recipients. For example, contacts 502, 504, 506 may be designated as a first category of recipient (e.g., primary or 'to' recipients), contact 514 may be designated as a second category of recipient (e.g., secondary or carbon copy recipient), and contacts 508, 510, 512 may be designated as a third category of recipient (e.g., blind carbon copy recipients), wherein a subsequent email may be sent to the selected contacts 502, 504, 506, 508, 510, 512,

514 in a manner that is influenced by the designated categories of recipients (e.g., contacts 502, 504, 506, 514 are not notified that the email was also sent to contacts 508, 510, 512).

Figure 7:
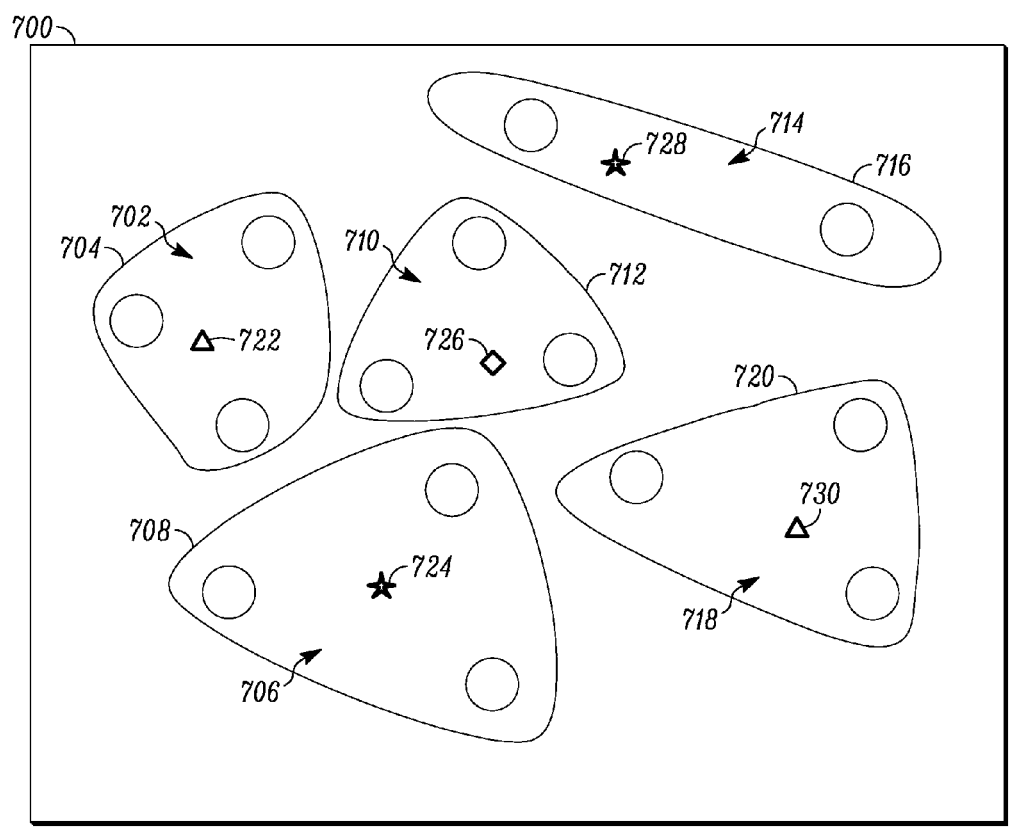
FIG. 7 depicts touch screen suitable for use with the object management process of FIG. 2 in accordance with another embodiment.

Referring now to FIG. 7, the object management process 200 may be utilized to associate groups of objects displayed on a touch screen 700. For example, as shown in FIG. 7, a user may select a first subset of objects 702 by drawing, tracing, or otherwise imparting a perimeter 704 on the surface of the touch screen 700 that circumscribes one or more objects 702 displayed on the touch screen 700 to define a first subset 702 of the displayed objects. Similarly, the user may impart additional perimeters 708, 712, 716, 720 on the touch screen 700 to circumscribe and define additional subsets 706, 710, 714, 718 of the displayed objects. The user may tag the subsets of displayed objects 702, 706, 710, 714, 718 by imparting input gestures 722, 724, 726, 728, 728 that overlie a portion of the area defined by the respective perimeters 704, 708, 712, 716, 720 or otherwise overlie an object of a subset. As shown in the illustrated embodiment, a first input gesture 722 overlies the touch screen 700 within the area defined by the first perimeter 704, a second input gesture 724 overlies the touch screen 700 within the area defined by the second perimeter 708, a third input gesture 726 overlies the touch screen 700 within the area defined by the third perimeter 712, a fourth input gesture 728 overlies the touch screen 700 within the area defined by the fourth perimeter 716, and a fifth input gesture 730 overlies the touch screen 700 within the area defined by the fifth perimeter 720.

As described above, the object management process 200 identifies the input gestures 722, 724, 726, 728, 730 as overlying or otherwise corresponding to the subsets of objects 702, 706, 710, 714, 718 and associates the subsets of objects 702, 706, 710, 714, 718 based on their associated input gestures (e.g., tasks 206, 208). In this regard, the object management process 200 associates the objects of the first subset 702 with objects of the fifth subset 718 because the input gesture 722 associated with the first subset 702 (i.e., the input gesture 722 located within the area defined by perimeter 704) substantially matches the input gesture 730 associated with the fifth subset 718 (i.e., the input gesture 730 located within the area defined by perimeter 720), that is, each input gesture 722, 730 substantially corresponds to a triangular shape. Similarly, the object management process 200 associates the objects of the second subset 706 with objects of the fourth subset 714 because the input gesture 724 associated with the second subset 706 substantially matches the input gesture 728 associated with the fourth subset 714 because each input gesture 724, 728 substantially corresponds to a star shape. Thus, in a similar manner as described above, any criteria assigned to the triangular-shaped input gesture 722, 730 will be assigned to or otherwise associated with each object of subsets 702, 718 and any criteria assigned to the star-shaped input gesture 724, 728 will be assigned to or otherwise associated with each object of subsets 706, 714 (e.g., task 210). As a result, the same action(s) will be performed on each object of the first subset 702 and each object of the fifth subset 718, and the same action(s) will be performed on each object of the second subset 706 and each object of the fourth subset 714 (e.g., task 212).

To briefly summarize, one advantage of the systems and/or methods described above is that a user may quickly and intuitively manage objects displayed on the touch screen. User-defined free-form input gestures may be used to associate or otherwise aggregate objects, and any criteria assigned to a user-defined input gesture applied to each object associated based on that respective input gesture. This reduces the number of operations performed by the user, and thus, improves the efficiency of the touch screen interface.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A portable device comprising:
   a touch screen, the touch screen including a touch panel overlying a display; and
   a processor coupled to the touch screen, the processor operable to control an operation of the portable device to:
      assign a first criterion to a first free-form input, wherein the first free-form input comprises a first gesture, and wherein the first criterion is associated with a first action;
      after assigning the first criterion to the first free-form input:
         concurrently output, for display at the touch screen, a plurality of objects;
         receive an indication of input performing the first free-form input gesture at a location of the touch screen that corresponds to a first subset of the plurality of objects;
         receive an indication of input performing a second free-form input gesture at a location of the touch screen that corresponds to a second subset of the plurality of objects;
         after receiving the indication of input performing the second free-form gesture, determine, based at least in part on geometric similarities between the second free-form gesture and the first free-form gesture, whether the second free-form gesture matches the first free-form gesture;
         responsive to receiving an indication that a user is done providing input following a determination that the second free-form gesture matches the first free-form gesture:
            group the first subset of the plurality of objects with the second subset of the plurality of objects; and
            after grouping the first subset of the plurality of objects with the second subset of the plurality of objects:
               assign, based on the assigning of the first criterion to the first free-form input and further based on the determination that the second free-form input matches the first free-form input, the first criterion to each object of both the first subset of the plurality of objects and the second subset of the plurality of objects; and
               perform, based on the first criterion, and without additional confirmation from the user, the first action with respect to each object of both the first subset of the plurality of objects and the second subset of the plurality of objects, wherein the first action is different from grouping the first subset of the plurality of objects with the second subset of the plurality of objects; and responsive to receiving the indication that the user is done providing input following a determination that the second free-form gesture does not match the first free-form gesture:

assign, based on the assigning of the first criterion to the first free-form input, the first criterion to each object of the first subset of the plurality of objects;

perform, based on the first criterion, a first action with respect to each object of the first subset of the plurality of objects;

assign, based on the assigning of a second criterion to the second free-form input, the second criterion to each object of the second subset of the plurality of objects, wherein the second criterion is different from the first criterion, wherein the second criterion is assigned to the second free-form input prior to receiving the second free-form input, and wherein the second criterion is associated with a second action that is different from the first action; and perform, based on the second criterion, the second action with respect to each object of the second subset of the plurality of objects.

2. The portable device of claim 1,
wherein the first criterion is associated with a delete operation, and
wherein the processor is operable to control the operation of the portable device to perform the first action at least by deleting both the first subset of the plurality of objects and the second subset of the plurality of objects.

3. A method comprising:
assigning, by an electronic device, a first criterion to a first free-form input, wherein the first free-form input comprises a first gesture, and wherein the first criterion is associated with a first action;

after assigning the first criterion to the first free-form input:
concurrently outputting, by the electronic device and for display, a plurality of objects, wherein the electronic device includes a touch panel that overlies a display, and wherein the plurality of objects are displayed on the display;

receiving, by the electronic device, the first free-form input at a location of the touch panel that overlies at least a portion of a first object of the plurality of objects;

receiving, by the electronic device, a second free-form input at a location of the touch panel that overlies at least a portion of a second object of the plurality of objects;

after receiving the second free-form input, determining, by the electronic device and based at least in part on geometric similarities between the second free-form input and the first free-form input, whether the second free-form input matches the first free-form input;

responsive to the electronic device receiving an indication that a user is done providing input following a determination that the second free-form input matches the first free-form input:

grouping, by the electronic device, the first object with the second object; and after grouping the first object with the second object:
assigning, by the electronic device, based on the assigning of the first criterion to the first free-form input and further based on the determination that the second free-form input matches the first free-form input, the first criterion to both the first object and the second object; and performing, by the electronic device and based on the first criterion, and without additional confirmation from the user, the first action with respect to both the first object and the second object, wherein the first action is different from grouping the first object with the second object; and responsive to the electronic device receiving the indication that the user is done providing input following a determination that the second free-form input does not match the first free-form input:

assigning, by the electronic device and based on the assigning of the first criterion to the first free-form input, the first criterion to the first object;

performing, by the electronic device and based on the first criterion, the first action with respect to the first object;

assigning, by the electronic device and based on the assigning of a second criterion to the second free-form input, the second criterion to the second object, wherein the second criterion is different from the first criterion, wherein the second criterion is assigned by the electronic device to the second free-form input prior to receiving the second free-form input, and wherein the second criterion is associated with a second action that is different from the first action; and performing, by the electronic device and based on the second criterion, the second action with respect to the second object.

4. The method of claim 3, wherein:
the first free-form input comprises a first symbol;
the second free-form input comprises a second symbol; and
determining whether the first free-form input matches the second free-form input comprises determining whether the first symbol matches the second symbol based on geometric similarities between the first symbol and the second symbol.

5. The method of claim 3, wherein responsive to the electronic device receiving the indication that the user is done providing input following the determination that the second free-form input does not match the first free-form input:
performing the first action with respect to the first object comprises saving the first object to a first file folder; and
performing the second action with respect to the second object comprises saving the second object to a second file folder, the second file folder being different from the first file folder.

6. The method of claim 3,
wherein the first criterion is associated with a delete operation, and
wherein performing the first action comprises deleting both the first object and the second object.

7. A method comprising:
assigning, by an electronic device, a criterion to a first free-form input, wherein the first free-form input comprises a first gesture, and wherein the criterion is associated with an action;
after assigning the criterion to the first free-form input:
   receiving, by the electronic device, the first free-form input at a location of a touch screen that overlies a first object of a plurality of objects;
   receiving, by the electronic device, a second free-form input at a location of the touch screen that overlies a second object of the plurality of objects;
   after receiving the second free-form input, determining, by the electronic device, whether the second free-form input matches the first free-form input; and
   responsive to the electronic device determining that the second free-form input matches the first free-form input:
      aggregating, by the electronic device, the first object and the second object as part of an aggregation of objects;
      after aggregating the first object and the second object:
         assigning, by the electronic device, based on the assigning of the criterion to the first free-form input and further based on the determining that the second free-form input matches the first free-form input, the criterion to both the first object and the second object; and
         automatically performing, by the electronic device and based on the criterion, the action for the aggregation of objects after detecting an indication that a user is done providing input, wherein the action is different from aggregating the first object and the second object.

8. The method of claim 7, wherein:
performing the action for the aggregation of objects includes saving the first and second objects to a file folder.

9. The method of claim 7, wherein the aggregation of objects is a first aggregation of objects, and wherein automatically performing the action for the first aggregation of objects comprises automatically performing a first action for the first aggregation of objects, the method further comprising:
   receiving a third free-form input at a location of the touch screen that overlies a third object of the plurality of objects;
   after receiving the third free-form input, determining whether the third free-form input matches at least one of the first free-form input or the second free-form input;
   responsive to determining that the third free-form input does not match either of the first free-form input or the second free-form input, aggregating the third object as part of a second aggregation of objects; and
   automatically performing a second action for the second aggregation of objects after detecting the indication that the user is done providing input for the concurrently displayed objects.

10. The method of claim 9, wherein performing the first action includes saving the first and second objects to a first file folder, and wherein performing the second action includes saving the third object to a second file folder, the second file folder being different from the first file folder.

11. The method of claim 7, wherein the plurality of objects represent a plurality of contacts, and wherein performing the action for the aggregation of objects comprises initiating a group call that includes, as participants, contacts represented by respective objects of the aggregation of objects.

12. The method of claim 7,
wherein the criterion is associated with a delete operation, and
wherein automatically performing the action for the aggregation of objects comprises deleting both the first object and the second object.

* * * * *